(12) United States Patent
Hunt et al.

(10) Patent No.: US 11,997,947 B2
(45) Date of Patent: Jun. 4, 2024

(54) SYSTEM AND METHOD FOR SETTING A PROFILE OF A HEADER DURING A NON-HARVESTING MODE

(71) Applicant: CNH Industrial America LLC, New Holland, PA (US)

(72) Inventors: Cory Douglas Hunt, Millersville, PA (US); Jethro Martin, Ephrata, PA (US)

(73) Assignee: CNH Industrial America LLC, New Holland, PA (US)

(*) Notice: Subject to any disclaimer, the term of this patent is extended or adjusted under 35 U.S.C. 154(b) by 585 days.

(21) Appl. No.: 16/724,945

(22) Filed: Dec. 23, 2019

(65) Prior Publication Data

US 2021/0185917 A1 Jun. 24, 2021

(51) Int. Cl.
G05B 15/02 (2006.01)
A01D 41/14 (2006.01)
G05B 19/00 (2006.01)

(52) U.S. Cl.
CPC ......... *A01D 41/145* (2013.01); *A01D 41/141* (2013.01); *A01D 41/144* (2013.01); *G05B 15/02* (2013.01); *G05B 19/00* (2013.01)

(58) Field of Classification Search
CPC .... A01D 41/141; A01D 41/145; A01D 43/04; A01D 34/283; A01D 41/14; A01D 41/144; G05B 15/02; G05B 19/00; G06Q 10/06; G06F 30/13; A01B 79/005
See application file for complete search history.

(56) References Cited

U.S. PATENT DOCUMENTS

| 5,463,854 | A | 11/1995 | Chmielewski et al. | |
| 6,681,551 | B1 | 1/2004 | Sheidler et al. | |
| 6,871,483 | B1 | 3/2005 | Panoushek | |
| 9,253,943 | B2 | 2/2016 | Buermann et al. | |
| 2011/0154795 | A1* | 6/2011 | Sauerwein | A01D 41/14 56/181 |
| 2017/0243117 | A1* | 8/2017 | Kephart | G06Q 10/06 |
| 2018/0139899 | A1* | 5/2018 | Shearer | A01D 34/283 |
| 2019/0261555 | A1* | 8/2019 | Baldwin | A01D 43/04 |
| 2019/0261564 | A1 | 8/2019 | Gunda et al. | |
| 2019/0324998 | A1* | 10/2019 | Caraballoso | G06F 30/13 |
| 2019/0335662 | A1* | 11/2019 | Good | A01B 79/005 |

FOREIGN PATENT DOCUMENTS

| EP | 3598886 A1 | 1/2020 |
| WO | 2014025346 A1 | 2/2014 |

OTHER PUBLICATIONS

International Search Report and Written Report for Application No. PCT/US2020/066028 dated Apr. 13, 2021 (14 pages).

* cited by examiner

*Primary Examiner* — Tuan A Vu
(74) *Attorney, Agent, or Firm* — Peter K. Zacharias; Rebecca L. Henkel; Rickard K. DeMille (57) ABSTRACT

An agricultural system includes a header and a controller. The controller is configured to receive a first input indicative of a set profile of the header, in which the set profile comprises a target position of the header for a non-harvesting mode, store the set profile of the header. The controller is further configured to receive a second input indicative of a selection of the non-harvesting mode, output a first signal to instruct the agricultural system to operate in the non-harvesting mode in response to receiving the second input, and output a second signal to set a current position of the header based on the set profile in response to receiving the second input.

20 Claims, 6 Drawing Sheets

SYSTEM AND METHOD FOR SETTING A PROFILE OF A HEADER DURING A NON-HARVESTING MODE

BACKGROUND

The disclosure relates generally to a header for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes a header and a controller. The controller is configured to receive a first input indicative of a set profile of the header, in which the set profile comprises a target position of the header for a non-harvesting mode, store the set profile of the header. The controller is further configured to receive a second input indicative of a selection of the non-harvesting mode, output a first signal to instruct the agricultural system to operate in the non-harvesting mode in response to receiving the second input, and output a second signal to set a current position of the header based on the set profile in response to receiving the second input.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header move the crops toward a crop processing system of the harvester. For example, the conveyor on the side draper deck(s) may move the cut crops toward an infeed draper deck at a center of the header. A conveyor on the infeed draper deck may then move the crops toward the processing system. The processing system may include a threshing machine configured to thresh the crops, thereby separating the crops into certain desired agricultural materials, such as grain, and material other than grain (MOG).

The desired agricultural materials may be sifted and then accumulated into a tank. When the tank fills to capacity, the materials may be collected from the tank. The MOG may be discarded from the harvester (e.g., via a spreader) by passing through an exit pipe or a spreader to fall down onto the field.

Figure 1:
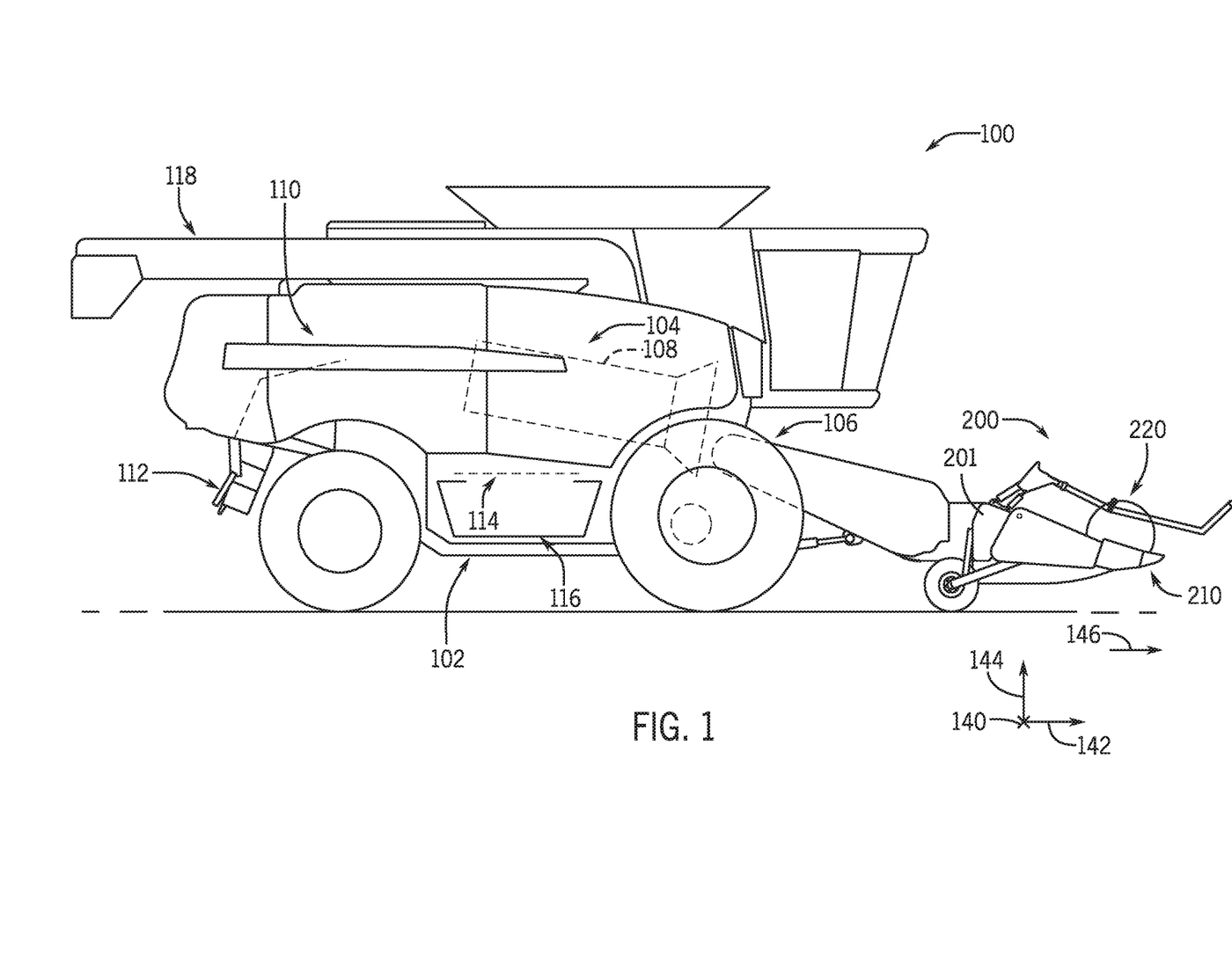
FIG. 1 is a side view of an embodiment of an agricultural system, in accordance with an aspect of the present disclosure.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 106 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

Figure 2:
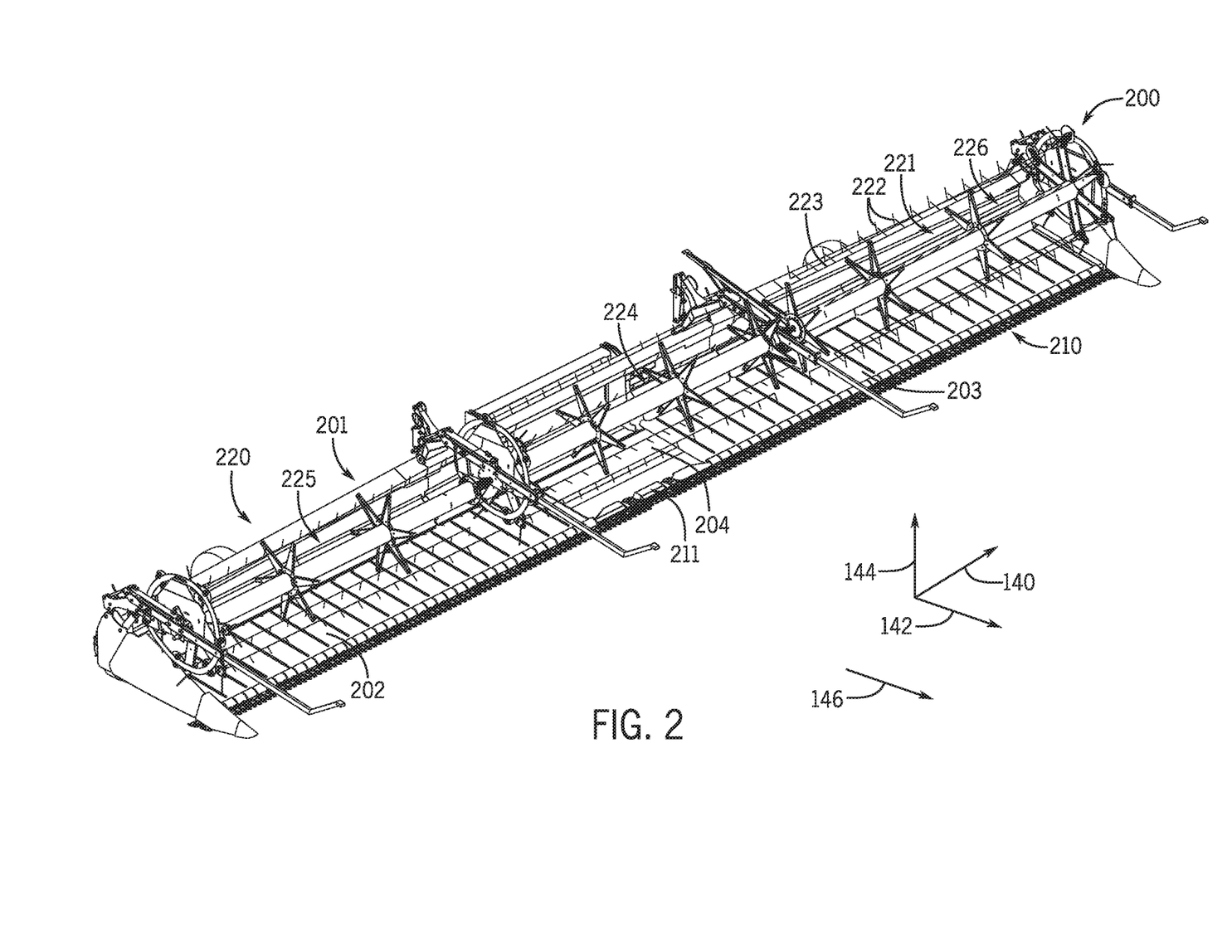
FIG. 2 is a perspective view of an embodiment of a header that may be employed within the agricultural system of FIG. 1, in accordance with an aspect of the present disclosure.

FIG. 2 is a perspective view of an embodiment of the header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of a width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers or tines 222 extending from a central framework 223. The central framework 223 is driven to rotate such that the fingers 222 move (e.g., in a circular pattern). The fingers 222 are configured to engage the crops and urge the cut crops toward the conveyor sections 202, 203 to facilitate transportation of the cut crops to the agricultural crop processing system.

As illustrated herein, the cutter bar assembly 210 is flexible along the width of the header 200. As discussed in detail below, the cutter bar assembly 210 is supported by multiple arm assemblies distributed along the width of the header 200. In some embodiments, the frame 201 of the header 200 may be movably coupled to the chassis of the agricultural system. Each arm assembly is mounted to the frame 201 and includes an arm coupled to the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200. Moreover, certain parts of the header 200 may move relative to one another. For example, the header 200 includes a first section (e.g., center section) 224, a second section 225 extending from a side of the first section 224, and a third section 226 extending from another side of the first section 224. The sections 224, 225, 226 may be movable relative to one another, such as to raise and/or lower the second section 225 and/or the third section 226 relative to the first section 224 in order to enable the cutter bar assembly 210 to follow the contour of the field more acutely.

Figure 3:
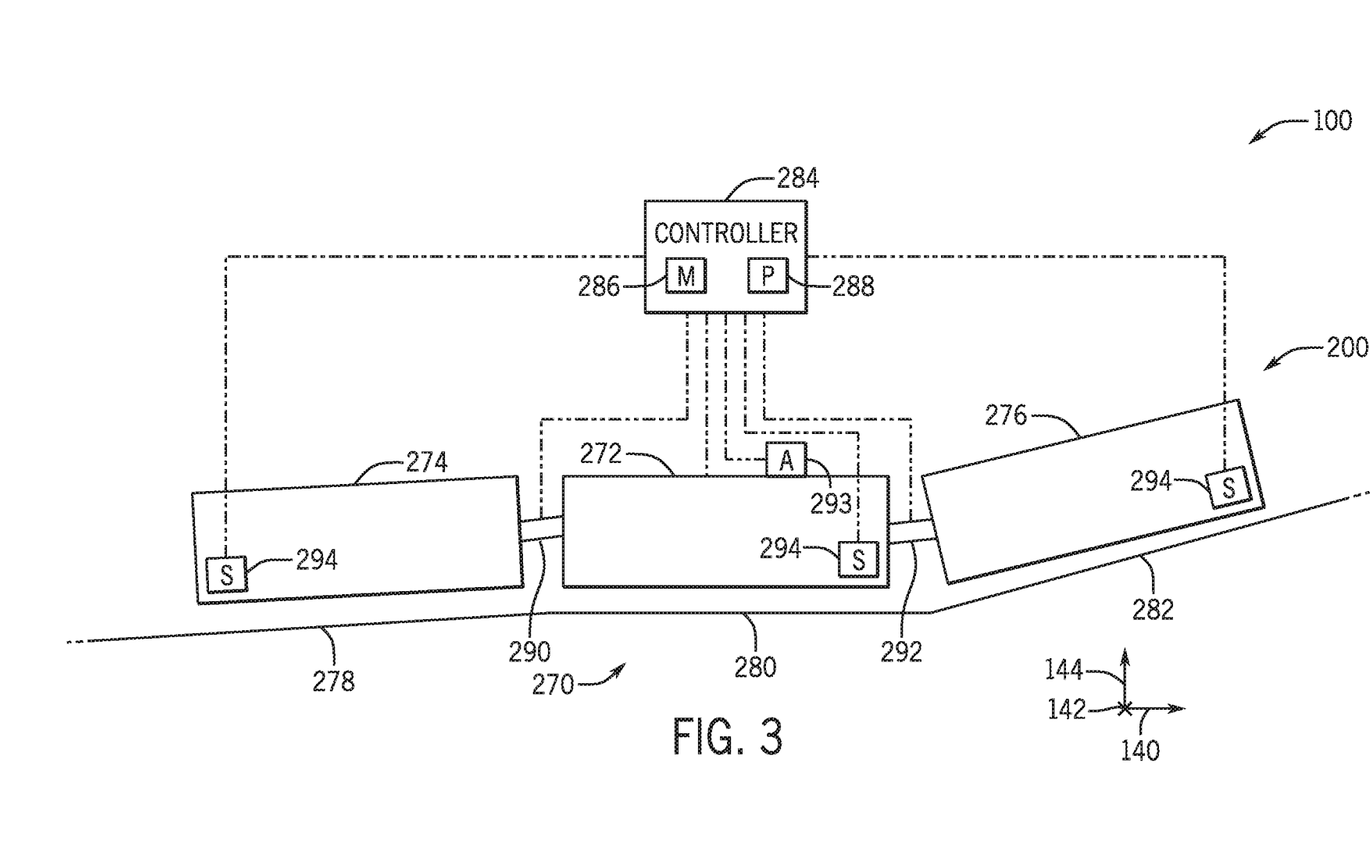
FIG. 3 is a schematic diagram of the agricultural system of FIG. 1 operating in a harvesting mode, in accordance with an aspect of the present disclosure.

FIG. 3 is a schematic diagram the agricultural system 100 of FIG. 1 operating in a harvesting mode. In the illustrated embodiment, the agricultural system 100 may be traveling in the direction of travel 146 of FIGS. 1 and 2 along the longitudinal axis 142, and FIG. 3 may represent a front view of the agricultural system 100. In the harvesting mode, the agricultural system 100 may position the header 200 proximate to a field 270. As such the cutter bar assembly of the header 200 may engage and effectively cut crops on the field 270 to harvest the field 270. The illustrated header 200 includes a center section 272, a first lateral section 274 extending laterally from the center section 272, and a second lateral section 276 extending laterally from the center section 272 opposite the first lateral section 274. Although the illustrated header 200 includes three sections 272, 274, 276, additional or alternative embodiments of the header may have any suitable number of sections, such as two sections, four sections, five or more sections, and so forth. In some embodiments, the first lateral section 274 and the second lateral section 276 may each be adjustable relative to the center section 272 so as to follow a contour of the field 270, avoid an obstacle, and so forth, and effectively harvest the field 270. For example, any of the lateral sections 274, 276 may be raised or tilted upward in a direction along the vertical axis 144 relative to the center section 272 and/or lowered or tilted downward in another direction along the vertical axis 144 relative to the center section 272.

Indeed, in the illustrated embodiment, the first lateral section 274 (e.g., a laterally-outer edge of the first lateral section 274) is lowered with respect to the center section 272 to follow a first surface 278 of the field 270 that is sloped downward with respect to a second surface 280 of the field 270. Moreover, the second lateral section 276 (e.g., a laterally-outer edge of the second lateral section 276) is raised with respect to the center section 272 to follow a third surface 282 of the field 270 that is sloped upward with respect to the second surface 280. For instance, the position of each lateral section 274, 276 may be set to maintain (e.g., substantially maintain) a distance between the field 270 and the header 200 below a distance threshold and closely follow the contour of the field 270. Additionally, each lateral section 274, 276 may be moved relative to the center section 272 independently of one another to enable the header 200 to follow the contour of the field 270 effectively.

In some embodiments, the agricultural system 100 may include a controller 284 (e.g., an electronic controller) configured to control operating parameters of the agricultural system 100, such as of the header 200. The controller 284 may include a memory 286 and a processor 288 (e.g., a microprocessor). The controller 284 may also include one or more storage devices and/or other suitable components. The processor 288 may be used to execute software, such as software for controlling the agricultural system 100 and/or the header 200. Moreover, the processor 288 may include multiple microprocessors, one or more "general-purpose" microprocessors, one or more special-purpose microprocessors, and/or one or more application specific integrated circuits (ASICS), or some combination thereof. For example, the processor 288 may include one or more reduced instruction set (RISC) or complex instruction set (CISC) processors. The memory 286 may include a volatile memory, such as random access memory (RAM), and/or a nonvolatile memory, such as read-only memory (ROM). The memory may store a variety of information and may be used for various purposes. For example, the memory 286 may store processor-executable instructions (e.g., firmware or software) for the processor 288 to execute, such as instructions for controlling the agricultural system 100 and/or the header 200. The memory 286 and/or the processor 288, or an additional memory and/or processor, may be located in any suitable portion of the agricultural system 100. By way of example, the controller 284 may be located in a cab of the agricultural system 100 and/or on the header 200. Furthermore, the controller 278 may include or be a distributed controller (e.g., located in the agricultural system 108 and in the header 200), the memory 280 may include multiple memories, and the processor 282 may include multiple processors.

The controller 284 may be communicatively coupled to the header 200 so as to move the header 200. In an example, the controller 284 may be configured to move an entirety of the header 200 relative to the field 270. For instance, the controller 284 may be configured to move the center section 272 relative to the field 270 without moving the lateral sections 274, 276 relative to the center section 272. Additionally or alternatively, the controller may tilt an entirety of the header relative to the field. That is, the controller may rotate the center section relative to the field without moving the lateral sections relative to the center section. In another example, the controller 278 may be configured to move the sections 272, 274, 276 relative to one another. To this end, the illustrated header 200 includes a first actuator 290 coupling the center section 272 and the first lateral section 274 together, and the illustrated header 200 includes a second actuator 292 coupling the center section 272 and the second lateral section 276 together. The controller 284 may output control signals to instruct the actuators 290, 292 to move the respective lateral sections 274, 276 relative to the center section 272. By way of example, the controller 284 may output a first control signal to instruct the first actuator 290 to raise or lower the first lateral section 274 relative to the center segment 272, and the controller 284 may output a second control signal to instruct the second actuator 292 to raise or lower the second lateral section 276 relative to the center segment 272. Indeed, the controller 284 may output the control signals independently of one another such that the actuators 290, 292 may move the respective lateral sections 274, 276 independently of one another. Although the actuators 290, 292 drive rotation of the lateral sections 274, 276 relative to the center section 272, the actuators 290, 292 may drive the lateral sections to move in other manners, such as sliding in a horizontal and/or vertical direction relative to the center section. The header 200 may further include a third actuator 293, which may control a position of an entirety of the header 200. For instance, the controller 278 may also output control signals to the third actuator 293 to rotate, raise, and/or lower the entirety of the header 200, raise the entirety of the header 200, in addition to or as an alternative to outputting control signals to the actuators 290, 292 to move the sections 272, 274, 276 relative to one another.

In certain embodiments, the controller 284 may be configured to output control signals to instruct the header 200 to move based on sensor feedback. For instance, the illustrated header 200 includes sensors 294 disposed on each of the sections 272, 274, 276. Each sensor 294 may be configured to monitor an operating parameter indicative of a distance between a portion of the header 200 (e.g., part of one of the sections 272, 274, 276) and the field 270. By way of example, the sensors 294 may include non-contact proximity sensors, such as optical sensors, infrared sensors, and/or light detecting and ranging (LIDAR) sensors, that may determine a position of the header 200 relative to the field 270 without contacting the field 270. As an example, the sensors 294 may be coupled to the header 200, such as on the frame, on a portion of the cutter bar assembly, on a portion of the reel assembly (e.g., the reel arm). The sensors 294 may determine a distance spanning between the field 270 and the header 200 (e.g., of the cutter bar assembly) to determine the position of the header 200 relative to the field 270. In additional or alternative embodiments, the sensors may include contact sensors, such as flex sensors and/or pressure sensors, that determine a position of the header relative to the field by contacting the field. By way of example, the contact sensors may bend or flex due to a force exerted by the field onto the contact sensors based on the position of the header relative to the field. Additionally or alternatively, the contact sensors may determine an amount of the force exerted by the field onto the contact sensors, an amount of bending or flexing of a part of the header, or another suitable operating parameter indicative of the position of the header relative to the field.

In any case, each sensor 294 may be communicatively coupled to the controller 284 and may transmit sensor feedback to the controller 284. The sensor feedback may indicate a reading of the distance between a corresponding portion of the header 200 and the field 270, and the controller 284 may operate the header 200 based on the received sensor feedback in the harvesting mode. As an example, in the harvesting mode, the controller 284 may set a position of the header 200 relative to the field 270 and/or may set a position of the sections 272, 274, 276 relative to one another based on the received sensor feedback to enable the agricultural system 100 to harvest the field 270 more effectively in the harvesting mode. Although the illustrated header 200 includes a single sensor 294 positioned at each section 272, 274, 276, in additional or alternative embodiments, the header may have any suitable number of sensors (e.g., one, two, three, four or more) positioned at any part of the header.

Each sensor 294 may be communicatively coupled to the controller 284 and may transmit sensor feedback to the controller 284. The sensor feedback may indicate a reading of the distance between a corresponding portion of the header 200 and the field 270, and the controller 284 may operate the header 200 based on the received sensor feedback. As an example, in the harvesting mode, the controller 284 may set a position of the header 200 relative to the field 270 and/or may set a position of any of the sections 272, 274, 276 relative to one another based on the received sensor feedback so as to maintain a distance between the sections 272, 274, 276 of the header 200 and the field 270. In certain embodiments, the distance between the sections 272, 274, 276 of the header 200 and the field 270 may be maintained within a distance range, which may include an upper distance threshold and a lower distance threshold. Accordingly, when the detected distance is above the upper distance threshold, the controller 284 may move a portion of the header 200 toward the field 270 to reduce the detected distance. Furthermore, when the detected distance is below a lower distance threshold, the controller 284 may move a portion of the header 200 away from the field 270 to increase the detected distance.

In an additional or an alternative embodiment, the controller may be configured to output control signals to instruct the header to move in response to receiving an input. The input may be a user input received from an operator of the agricultural system, such as via a user interface, and the user input may indicate a target position of the header, such as a position of the header relative to the field and/or a desirable orientation of the sections of the header relative to one another. Thus, the operator may manually select which lateral sections to move relative to the center section and/or the extent to which the lateral sections move relative to the center section. In further embodiments, the controller may be pre-programmed to output control signals to instruct the header to move. That is, for example, the controller may output control signals to instruct the header to move at particular times during the operation of the agricultural system. Accordingly, the controller may automatically output the control signals with or without having received sensor feedback and/or a user input.

Figure 4:
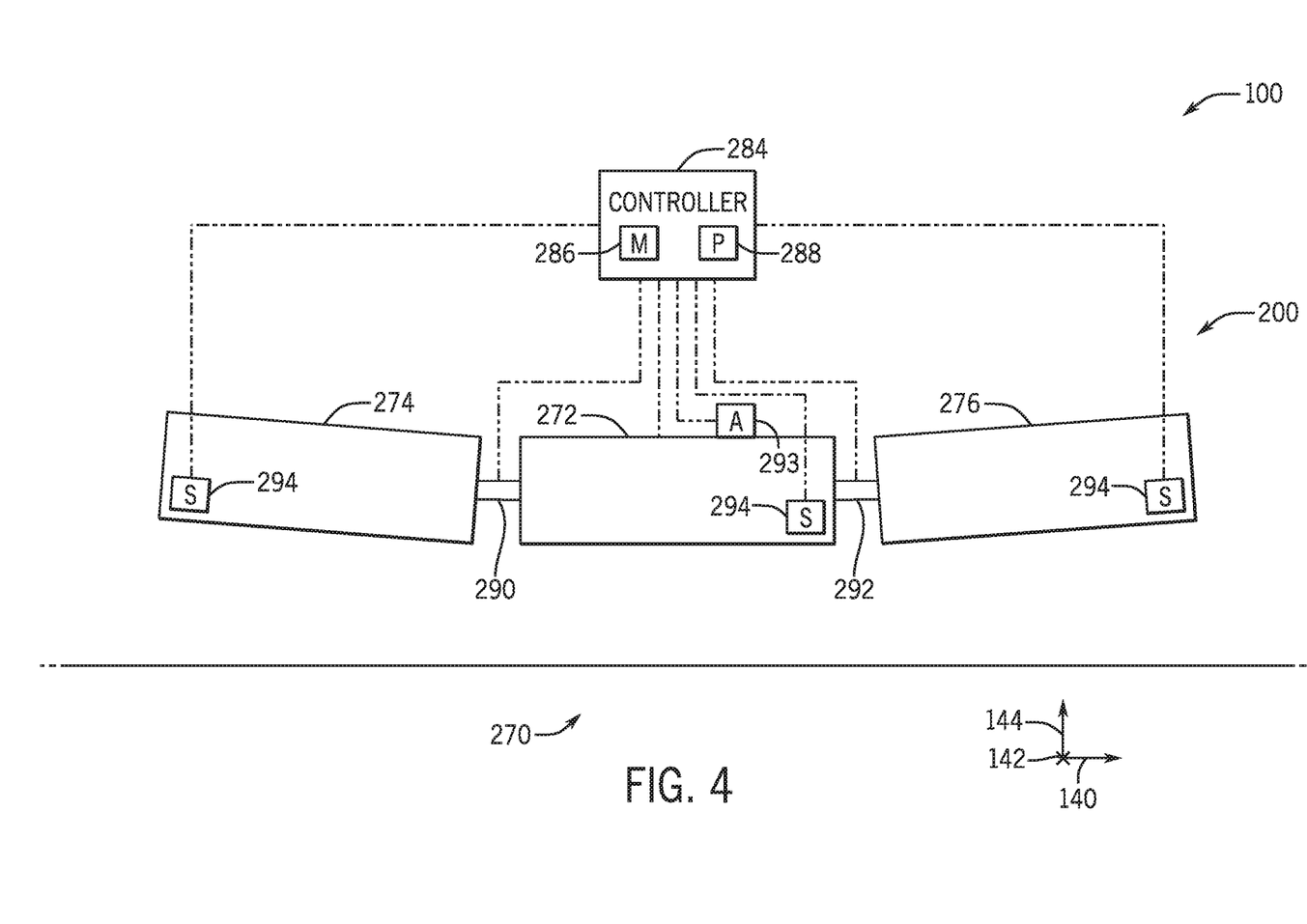
FIG. 4 is a schematic diagram of the agricultural system of FIG. 1 operating in a non-harvesting mode, in accordance with an aspect of the present disclosure.

FIG. 4 is a schematic diagram of the agricultural system 100 of FIG. 1 operating in a non-harvesting mode. As used herein, the non-harvesting mode refers to a mode in which it is not desired for the header 200 to engage and harvest the crops. For example, the components of the header 200 (e.g., the cutter bar assembly) may be functioning (e.g., the reel of the reel assembly is rotating, the moving blade assembly of the cutter bar assembly is oscillating), but the header 200 is not positioned to engage the field 270 and cut the crops. As an example, the agricultural system 100 may be configured to cut crops while traveling along various swaths of the field 270. However, the agricultural system 100 may transition (e.g., turn) between the swaths, and it may not be desirable to cut crops while transitioning between the swaths. As such, the controller 284 may operate the agricultural system 100 in the non-harvesting mode while the agricultural system 100 is transitioning between the swaths. Additionally or alternatively, the controller may operate the agricultural system in the non-harvesting mode while the agricultural system is being transported, such as to position the agricultural system on the field in preparation for initiating the harvesting mode to harvest the field (e.g., at a desirable location on the field), and/or while the agricultural system is parked or stopped, such as for performing inspection or maintenance.

In any case, during the non-harvesting mode, the controller 284 may output a signal to instruct the header 200 to be positioned in a set profile. As used herein, the set profile refers to a positioning of the header 200 upon an initialization of the non-harvesting mode. For instance, the set profile may be a positioning of the header 200 that generally reduces a likelihood of any portion of the header 200 contacting the field 270. To this end, the set profile of the header 200 may include raising the header 200 (e.g., raising the center section 272) away from the field 270 via the third actuator 293. Further, in certain embodiments, the set profile of the header 200 may also include a particular orientation of the sections 272, 274, 276 relative to one another. For example, the illustrated set profile may include a U-shaped orientation of the header 200, in which the laterally-outer ends of the lateral sections 274, 276 are positioned further from the field 270 relative to the laterally-inner ends of the lateral sections 274, 276 and the center section 272. However, additional or alternative set profiles may have any suitable shape, such as a substantially flat or straight shape in which the sections are substantially leveled relative to one another (e.g., a respective central axis of each section is substantially parallel to the lateral axis of the header, substantially parallel to a surface on which the header or the agricultural system is positioned, substantially level or straight when visualized from a position forward of the header, and the like).

In some circumstances, it may be desirable for a user, such as the operator of the agricultural system, to modify and/or select the set profile of the header 200. By way of example, the user may want to have access to and/or create one or more set profiles of the header 200, such as for different types of non-harvesting modes. To this end, the agricultural system 100 may enable the user to modify an existing set profile, create an additional set profile, remove a set profile, or any combination thereof. As an example, the controller 284 may be utilized by the user for setting a set profile of the header 200. Although the present disclosure primarily discusses setting a set profile of the header 200 for a non-harvesting mode of the agricultural system 100, it should be noted that the set profile of the header may additionally or alternatively be set for a harvesting mode of the agricultural system. For instance, upon initiation of the harvesting mode, the header may be positioned in accordance to the set profile to prepare for engagement of the field. After the header is moved to the set profile, the orientation of the header may be changed (e.g., the sections may be moved to deviate from the set profile) while the agricultural system continues to operate in the harvesting mode so as to follow the contour of the field.

Figure 5:
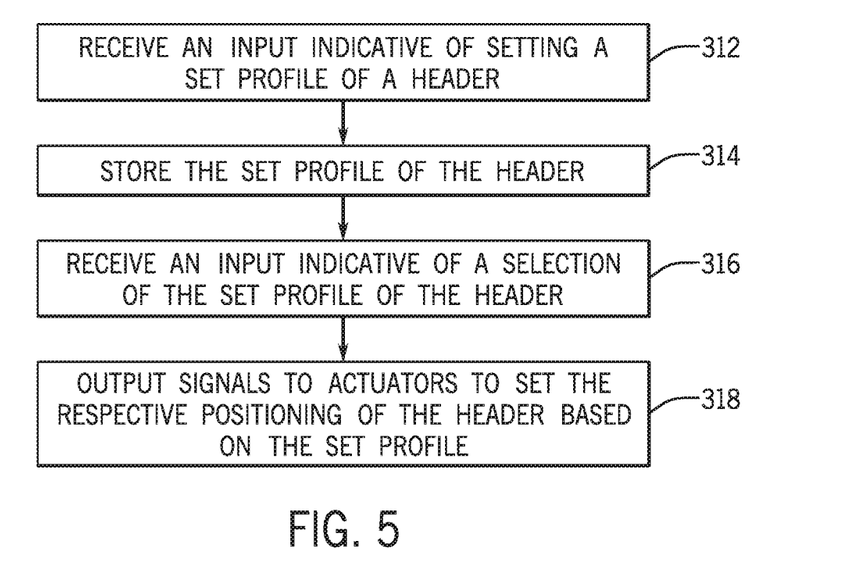
FIG. 5 is a block diagram of an embodiment of a method for positioning a header, such as the header of FIG. 2, upon an initialization of a non-harvesting mode, in accordance with an aspect of the present disclosure.

FIG. 5 is a block diagram of an embodiment of a method 310 for positioning the header, such as the header of FIG. 2, upon an initialization of the non-harvesting mode. The method 310 may be performed by a controller, such as the controller 284 of FIGS. 3 and 4, of the agricultural system. It should be noted that in additional or alternative embodiments, a different method than the method 310 depicted in FIG. 5 may be performed for positioning the header upon the initialization of the non-harvesting mode. For instance, additional steps may be performed and/or certain steps of the method may be removed, modified, and/or performed in a different order.

At block 312, an input indicative of setting a set profile of the header is received. In some embodiments, the input may be indicative of modifying an existing set profile. As an example, the existing set profile may be a default set profile created during manufacture of the agricultural system. As another example, the existing set profile may be a set profile previously created by the user. Additionally or alternatively, the input may be indicative of creating a new set profile, which does not change or modify any of the currently existing set profiles. Further still, the input may be indicative of removing an existing profile (e.g., without creating a new set profile to replace the existing profile).

In certain embodiments, the input may be received as a user input. For example, the agricultural system may have a user interface with which the user may interact for setting the set profile of the header. In additional or alternative embodiments, the input may be automatically received (e.g., without a user input), such as during an operation of the agricultural system. As an example, based on sensor feedback, the agricultural system may determine a current set profile is not desirable (e.g., sensor feedback indicates that the current set profile sets the header too close to the field on which the agricultural system is operated). In response, the agricultural system may automatically change the currently set profile and/or create a new set profile (e.g., to raise the header relative to the field).

At block 314, the set profile is stored or saved. Thus, the set profile may be readily utilized upon the initialization of the non-harvesting mode, and the header may be positioned in substantially the same set profile upon the initialization of the non-harvesting mode. Indeed, multiple set profiles may be stored such that any of the set profiles may be readily utilized to position the header accordingly (e.g., based on a selected set profile).

At block 316, an input indicative of a selection of one of the set profiles is received. In some embodiments, the header may be configured to operate in different types of non-harvesting modes, each of which may be associated (e.g., due to manufacture settings and/or due to selection or input by the user) with a respective set profile. Thus, the input may be indicative of a selection of a particular non-harvesting mode, and the initialization of the particular non-harvesting mode causes the header to be moved to the particular set profile corresponding to the particular non-harvesting mode. For this reason, storing the set profile, as described with respect to block 314, may also include associating the set profile with one of the non-harvesting modes. In additional or alternative embodiments, the input may be indicative of a direct selection of one of the set profiles. In other words, instead of selecting one of the non-harvesting modes for the header to be moved to the corresponding set profile, the user may directly select one of the set profiles.

In response to receiving the input indicative of the selection of the set profile, a signal may be output to instruct an actuator of the header for setting the positioning of the header based on the set profile, as indicated at block 318. For instance, a determination of a target positioning of the header in the set profile, such as a height of the header relative to the field and/or a position (e.g., an orientation) of the sections of the header relative to one another, may be made. Accordingly, the signal may be sent to instruct the actuator so as to set the positioning of the header to match the target positioning of the header, thereby positioning the header in accordance to the set profile. In certain embodiments, the header may have a sensor configured to determine the current positioning of the header (e.g., of the sections relative to one another), and the signal may be sent to instruct the actuator to adjust the positioning of the header until the sensor indicates the current positioning of the header substantially matches the target positioning of the header.

Figure 6:
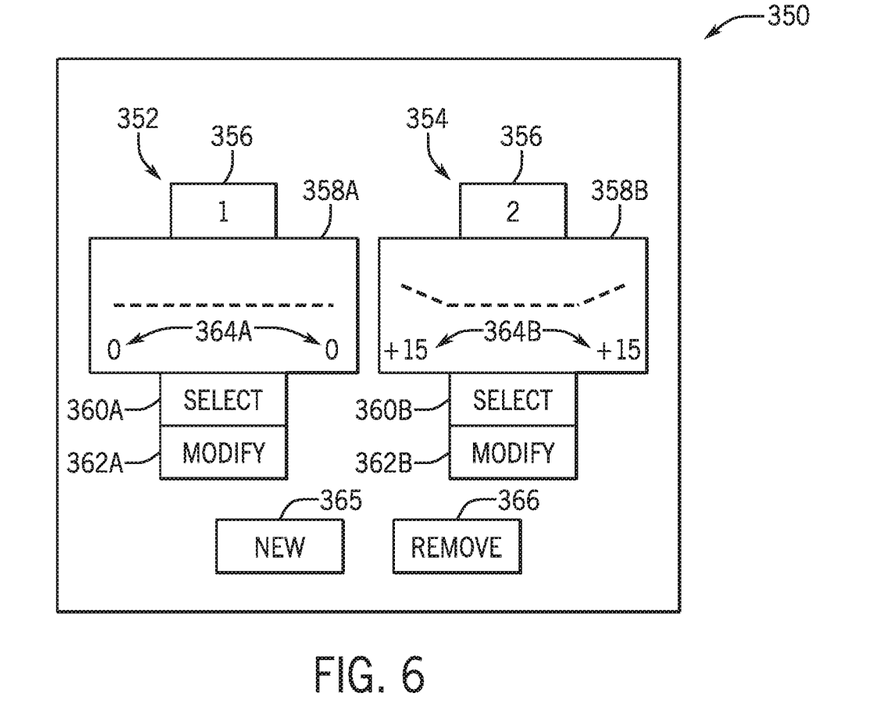
FIG. 6 is a schematic diagram of an embodiment of a user interface that may be used for performing actions on set profiles of a header, such as the header of FIG. 2, in accordance with an aspect of the present disclosure.

FIG. 6 is a schematic diagram of an embodiment of a user interface 350 that may be used for performing actions on set profiles of the header, such as the header of FIG. 2. As an example, the user interface 350 may be disposed in the cab of the agricultural system such that the user may interact with the user interface 350 when operating the agricultural system. In some embodiments, the user interface 350 may be a part of the controller of the agricultural system to enable the user interface 350 to transmit feedback to the controller for operating the agricultural system (e.g., the header) based on received user interactions.

In the illustrated embodiment, the user interface 350 is a touchscreen having a display presenting one or more set profiles, such as a first set profile 352 and a second set profile 354. However, in additional or alternative embodiments, the user interface 350 may include other features and/or components, such as a keyboard, a mouse, a trackpad, a button, a switch, a knob, and so forth. For each set profile 352, 354, the user interface 350 may present a respective title 356, a respective image 358, a respective select icon 360, and/or a respective modify icon 362. The title 356 may distinguish the set profiles 352, 354 from one another. The illustrated titles 356 include numerals but additional or alternative titles may include operation text (e.g., transportation mode 1, transportation mode 2, turning operation, parking mode, storage operation), a picture, or any other suitable features to distinguish the set profiles 352, 354 from with another.

Each image 358 may present respective appearances of the set profiles 352, 354. The appearances may indicate the positioning of the header in the corresponding set profile 352, 354. In the illustrated embodiment, a first image 358A for the first set profile 352 indicates a substantially flat or straightened orientation of the header, and a second image 358B for the second set profile 352 indicates a U-shaped orientation of the header. Furthermore, each image 358 also presents values 364 indicative of the orientations of the sections of the header in the set profile. For instance, the values 364 may indicate an angle of the lateral sections relative to the center section. Accordingly, first values 364A of the first set profile 352 indicate 0 degrees for the lateral sections, thereby indicating a leveled positioning of the lateral sections, and second values 364B indicate 15 degrees for the lateral sections, thereby indicating a raised positioning of the lateral sections. In additional or alternative embodiments, the values may indicate the positioning of the header in another manner. By way of example, the values may indicate the positioning of the sections with reference to a positioning range (e.g., 0 percent indicates a fully lowered position of the section, 100 percent indicates a fully raised position of the section), a text description of the sections (e.g., low, medium, high), a distance of the section relative to the field, a distance of a part, such as an end point, of the lateral sections relative to one another (e.g., for symmetrical positioning) and the like. In further embodiments, the images 358 may indicate additional information regarding the set profiles 352, 354, such as a height of the header relative to the field, a tilt or rotation of the header relative to the field, and so forth. Additionally, although the illustrated images 358 present the header as having the first lateral section and the center section extending off the center section, alternative embodiments of the user interface may present the header in accordance to the number of sections included in the header.

Each select icon 360 may be used for initializing the corresponding set profile 352, 354. Accordingly, a selection of a first select icon 360A may initialize a non-harvesting mode corresponding to the first set profile 352 and/or may set the position of the header based on the first set profile 352. Further, a selection of a second select icon 360B may initialize another non-harvesting mode corresponding to the second set profile 354 and/or may set the position of the header based on the second set profile 354. Furthermore, each modify icon 362 may be used to request to modify the corresponding set profile 352, 354. In this way, a selection of a first modify icon 362A may enable the user to request to modify the first set profile 352 and a selection of a second modify icon 362B may enable the user to modify the second set profile 354.

The illustrated user interface 350 also includes a new icon 365, which the user may select to request to add or create a new set profile (e.g., a third set profile). The illustrated user interface 350 further includes a remove icon 366, which the user may select to request (e.g., transmit a removal input) to remove one of the set profiles 352, 354 currently existing. Accordingly, the number of set profiles displayed by the user interface 350 may change as the user adds and removes set profiles. The user interface may also present additional or alternative information, such as a description (e.g., to present an annotation for the operator), statistics for each set profile, and the like. Accordingly, such information may be used by the operator for selecting and/or modifying the set profiles. The user interface may further present additional or alternative icons for the user to select, such as to scroll through various set profiles (e.g., a library of set profiles), to organize certain set profiles (e.g., for ordering the display of the set profiles and/or arranging the set profiles in different categories and/or associating the set profiles with different modes), and the like. Thus, the user interface 350 may enable the user to control an overall collection of the set profiles 352, 354.

Figure 7:
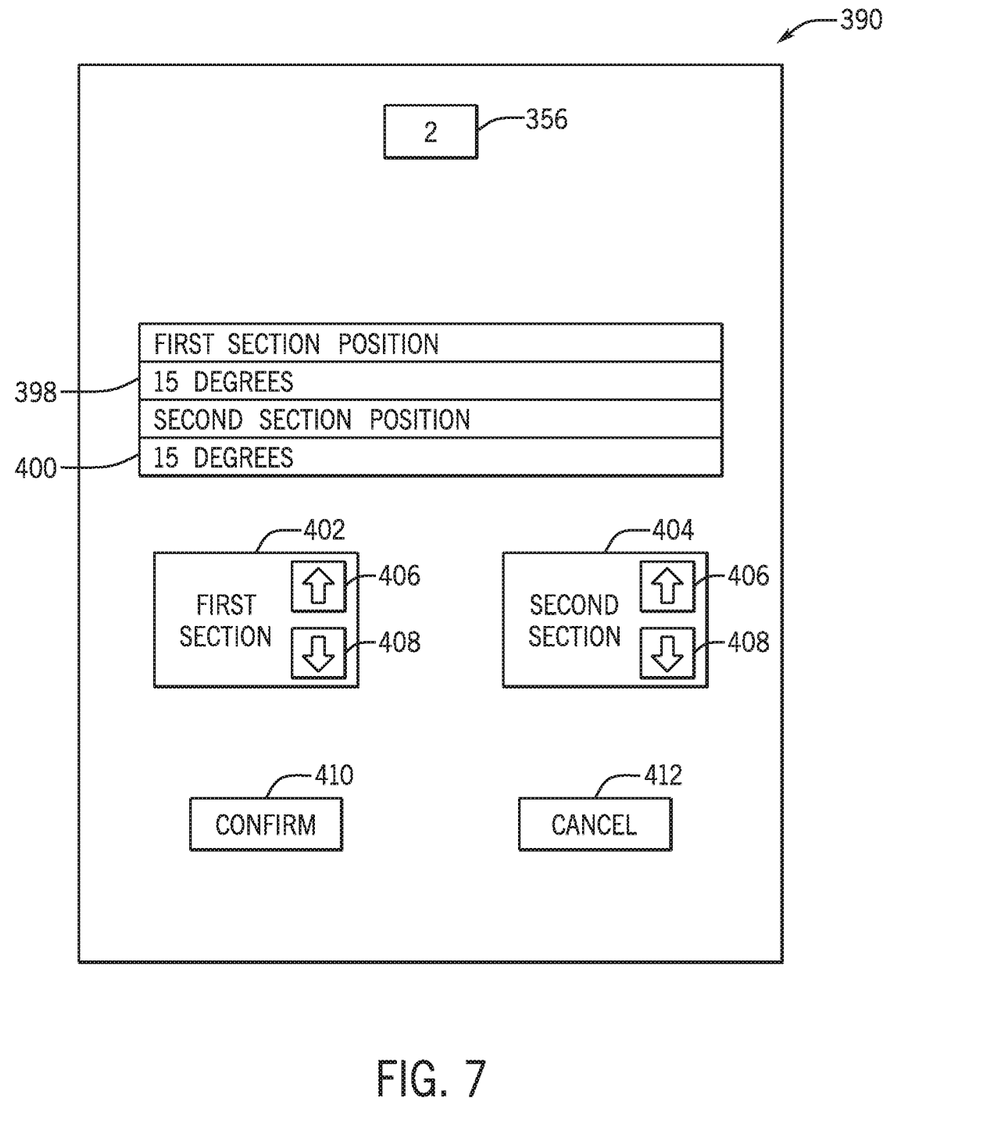
FIG. 7 is a schematic diagram of an embodiment of a user interface that may be used to set a particular set profile of a header, such as the header of FIG. 2, in accordance with an aspect of the present disclosure.

FIG. 7 is a schematic diagram of an embodiment of another user interface 390 that may be used to set one of the set profiles of the header, such as the header of FIG. 2. In the illustrated embodiment, the user interface 390 may be utilized for modifying the second profile 354 of FIG. 6 in particular, but the user interface may additionally or alternatively be utilized for creating a new set profile and/or modifying other set profiles. As an example, the user interface 390 may be displayed upon selection of the second modify icon 362B. In the illustrated embodiment, the user interface 390 presents the corresponding title 356 of the set profile to indicate which set profile is being modified by the user. The user interface 390 may display information regarding the respective positioning of the sections. In the illustrated embodiment, the user interface 390 displays a first section position 398 to indicate a position of the first lateral section relative to the center section. The user interface 390 also displays a second section position 400 to indicate a position of the second lateral section relative to the center section. The illustrated user interface 390 presents the position information regarding the sections positions in degrees (e.g., angular degrees), but in additional or alternative embodiments, the user interface 390 may present the position information in another manner, such as with reference to parameters such as the positioning range, the text description of the sections, a distance relative to the field, a distance relative to another part of the agricultural system (e.g., relative to another lateral section) and the like.

Furthermore, the user interface 390 may present adjustment controls, such as a first adjustment control 402 corresponding to the first lateral section and a second adjustment control 404 corresponding to the second lateral section. Each of the adjustment controls 402, 404 may include an up icon 406 and a down icon 408. The up icon 406 may be selected to raise the positioning of the corresponding section (e.g., relative to the center section) in the set profile and the down icon 408 may be selected to lower the positioning of the corresponding section (e.g., relative to the center section) in the set profile. By way of example, the user may continuously select (e.g., tap, hold) one of the corresponding icons to move the sections accordingly. In additional or alternative embodiments, the user interface may enable the user to directly input a desired positioning of the sections of the header in the set profile. By way of example, the user may directly input a target angle or one of the parameters disclosed herein for one of the sections. Although the illustrated user interface 390 presents the controls 402, 404 as configured to set respective positioning of two sections of the header, the user interface may present controls configured to set respective positioning of any suitable number of sections of the header. In further embodiments, the user interface may present controls configured to set the set profile in a different manner, such as based on a position of the actuators configured to move the sections. That is, instead of setting the positioning of the sections directly, the user interface may be used for setting the positioning of the corresponding actuators, thereby also setting the positioning of the sections accordingly. Further still, the user interface may additionally or alternative be used for setting another positioning of the header, including a rotation of the entire header about the field, a height of the entire header relative to the field, and so forth. Indeed, the user interface may be used to set the positioning of the header in any suitable manner, including to slide the lateral sections in a horizontal and/or vertical direction relative to the center section.

The user interface 390 further includes a confirm icon 410 and a cancel icon 412. The confirm icon 410 may be selected by the user to request to store or save the set profile. As such, the stored set profile may be readily selectable, such as via the user interface 350 of FIG. 6. Accordingly, the user interface 350 of FIG. 6 may be updated to indicate that the stored set profile is available for selection (e.g., by updating the presented images 358). The cancel icon 412 may be selected to terminate setting the particular set profile without saving any of the positionings set via the user interface 390. For instance, upon selection of the cancel icon 412, the user may exit the user interface 390 (e.g., to navigate back to the user interface 350 of FIG. 6) without storing the set profile.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
a header comprising a plurality of sections, wherein each section of the plurality of sections comprises a respective portion of a cutter bar assembly that is configured to cut crops in a field;
at least one actuator configured to move at least one section of the plurality of sections along a vertical axis relative to at least one other section of the plurality of sections; and
a controller configured to:
receive a first input indicative of a set profile of the header, wherein the set profile comprises a target position of the header for a non-harvesting mode, and the target position defines a respective relative orientation of each section of the plurality of sections;
store the set profile of the header;
receive a second input indicative of a selection of the non-harvesting mode;
output a first signal to instruct the agricultural system to operate in the non-harvesting mode in response to receiving the second input; and
output a second signal to instruct the at least one actuator to move the at least one section of the plurality of sections along the vertical axis relative to the at least one other section of the plurality of sections to set a current position of the header based on the set profile in response to receiving the second input.

2. The agricultural system of claim 1, wherein the controller is configured to output the second signal to instruct the at least one actuator to move the at least one section of the plurality of sections along the vertical axis relative to the at least one other section of the plurality of sections to set the current position of the header to match the target position of the header associated with the set profile.

3. The agricultural system of claim 1, wherein the agricultural system comprises a user interface communicatively coupled to the controller, and the first input, the second input, or both, are received via the user interface.

4. The agricultural system of claim 3, wherein the controller is configured to receive a third input to modify the set profile of the header via the user interface.

5. The agricultural system of claim 1, wherein the controller is configured to output the first signal to instruct an additional actuator to raise the header away from a field in response to receiving the second input.

6. The agricultural system of claim 1, wherein the plurality of sections comprises a first lateral section comprising a first portion of a frame of the header, a second lateral section comprising a second portion of the frame of the header, and a center section comprising a center portion of the frame of the header and positioned between the first lateral section and the second lateral section along a lateral axis of the header, and the at least one actuator comprises a first actuator configured to move the first lateral section along the vertical axis relative to the center section and a second actuator configured to move the second lateral section along the vertical axis relative to the center section.

7. A non-transitory computer readable medium comprising executable instructions that, when executed by a processor, are configured to cause the processor to:
store a plurality of set profiles in a storage device, wherein a first set profile of the plurality of set profiles comprises a first target position that defines a respective first orientation of each section of a plurality of sections arranged laterally across a header of an agricultural system and a second set profile of the plurality of set profiles comprises a second target position that defines a respective second orientation of each section of the plurality of sections arranged laterally across the header of the agricultural system, each section of the plurality of sections comprises a respective portion of a cutter bar assembly that is configured to cut crops in a field, the first set profile is associated with a first operation mode of the agricultural system, and the second set profile is associated with a second operation mode of the agricultural system different than the first operation mode;

output a first signal to instruct the agricultural system to operate in the first operation mode in response to receiving a first input indicative of a selection of the first operation mode; and output a second signal to instruct at least one actuator to move at least one section of the plurality of sections along a vertical axis relative to at least one other section of the plurality of sections to set a current position of the header based on the first set profile in response to receiving the first input.

8. The non-transitory computer readable medium of claim 7, wherein the instructions, when executed by the processor, are configured to cause the processor to instruct a user interface to display an image that represents each section of the plurality of sections in the first set profile for visualization by a user.

9. The non-transitory computer readable medium of claim 7, wherein the instructions, when executed by the processor, are configured to cause the processor to:

output a third signal to instruct the agricultural system to operate in the second operation mode in response to receiving a second input indicative of an additional selection of the second operation mode; and output a fourth signal to instruct the at least one actuator to move the at least one section of the plurality of sections along the vertical axis relative to the at least one other section of the plurality of sections to set the current position of the header based on the second set profile in response to receiving the second input.

10. The non-transitory computer readable medium of claim 7, wherein the instructions, when executed by the processor, are configured to cause the processor to:

receive an additional input indicative of a third set profile, wherein the third set profile is created by a user via a user interface;

add the third set profile into the plurality of set profiles in response to receiving the additional input;

associate the third set profile with a third operation mode;

receive a further input indicative of an additional selection of the third operation mode;

output a third signal to instruct the agricultural system to operate in the third operation mode in response to receiving the further input indicative of the additional selection of the third operation mode; and output a fourth signal to instruct the at least one actuator to move the at least one section of the plurality of sections along the vertical axis relative to the at least one other section of the plurality of sections to set the current position of the header based on the third set profile in response to receiving the further input.

11. The non-transitory computer readable medium of claim 7, wherein the instructions, when executed by the processor, are configured to cause the processor to:

receive a removal input indicative of a request to remove the second set profile of the plurality of set profiles; and output a third signal to remove the second set profile from the storage device.

12. The non-transitory computer readable medium of claim 7, wherein the instructions, when executed by the processor, are configured to cause the processor to:

receive an additional input indicative of modifying the second set profile of the plurality of set profiles into an updated set profile; and replacing the second set profile with the updated set profile in the storage device in response to receiving the additional input.

13. The non-transitory computer readable medium of claim 7, wherein the first operation mode is a first type of non-harvesting mode performed while the agricultural system is being transported to a field, and the second operation mode is a second type of non-harvesting mode performed while the agricultural system makes turns between harvesting swaths of the field, is stopped, or is parked.

14. An agricultural system, comprising:

a header comprising a plurality of sections that extend across a width of the header, wherein the plurality of sections comprises a first lateral section with a first portion of a cutter bar assembly, a second lateral section with a second portion of a cutter bar assembly, and a center section positioned between the first lateral section and the second lateral section across the width of the header;

a first actuator configured to move the first lateral section along a vertical axis relative to the center section; and a controller configured to:

display a user interface, wherein the user interface presents a plurality of set profiles stored by the controller, wherein each set profile of the plurality of set profiles corresponds with an associated operation mode, and each set profile of the plurality of set profiles comprises a respective target position for each of the first lateral section, the second lateral section, and the center section of the header upon an initialization of the associated operation mode;

receive a user input indicative of a selection of a set profile of the plurality of set profiles;

output a first signal to instruct the agricultural system to operate in the associated operation mode in response to receiving the user input; and output a second signal to instruct the first actuator to move the first lateral section along the vertical axis relative to the center section to set a current position of the header based on the set profile in response to receiving the user input.

15. The agricultural system of claim 14, wherein the controller is configured to:

receive, via the user interface, an additional user input indicative of a request to modify an additional set profile of the plurality of set profiles; and display an additional user interface in response to receiving the additional user input, wherein the additional user interface presents a plurality of selectable icons, wherein each selectable icon of the plurality of selectable icons is configured to modify the additional set profile.

16. The agricultural system of claim 15, wherein each selectable icon of the plurality of selectable icons is configured to modify a selected target position of the first lateral section of the plurality of sections associated with the additional set profile, and the selected target position comprises a respective orientation of the first lateral section relative to the center section.

17. The agricultural system of claim 16, wherein the additional user interface presents an image that represents the plurality of sections of the header, and the image illustrates a current position of the first lateral section relative to the center section.

18. The agricultural system of claim 15, wherein the controller is configured to:

receive a further user input indicative of a request to store the additional set profile of the plurality of set profiles; and display an updated user interface in response to the further user input, wherein the updated user interface presents the plurality of set profiles stored by the controller based on the modification of the additional set profile of the plurality of set profiles.

19. The agricultural system of claim 14, comprising a second actuator configured to drive the second lateral section to move along the vertical axis relative to the center section, wherein the controller is configured to output a third signal to instruct the second actuator to drive the second lateral section to move along the vertical axis relative to the center section to set the current position of the header based on the set profile in response to receiving the user input.

20. The agricultural system of claim 14, wherein the first actuator is configured to rotate the first lateral section relative to the center section to move the first lateral section along the vertical axis relative to the center section.

* * * * *